US009420412B2

(12) United States Patent
Ho

(10) Patent No.: US 9,420,412 B2
(45) Date of Patent: Aug. 16, 2016

(54) VEHICLE POSITION CALIBRATION METHOD AND APPARATUS

(71) Applicant: INDUSTRIAL TECHNOLOGY RESEARCH INSTITUTE, Hsinchu (TW)

(72) Inventor: Ping-Fan Ho, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 96 days.

(21) Appl. No.: 14/309,113

(22) Filed: Jun. 19, 2014

(65) Prior Publication Data
US 2015/0177003 A1 Jun. 25, 2015

(30) Foreign Application Priority Data

Dec. 25, 2013 (TW) .............................. 102148222 A

(51) Int. Cl.
G01C 21/00 (2006.01)
H04W 4/02 (2009.01)
G01S 19/23 (2010.01)
G01S 19/40 (2010.01)
(Continued)

(52) U.S. Cl.
CPC ............... *H04W 4/02* (2013.01); *G01S 5/0072* (2013.01); *G01S 5/0263* (2013.01); *G01S 19/23* (2013.01); *G01S 19/40* (2013.01)

(58) Field of Classification Search
None
See application file for complete search history.

(56) References Cited

U.S. PATENT DOCUMENTS 6,014,102 A 1/2000 Mitzlaff et al.
6,230,018 B1 5/2001 Watters et al.
(Continued)

FOREIGN PATENT DOCUMENTS

CN 102707303 A 10/2012
JP H0755912 A 3/1995
(Continued)

OTHER PUBLICATIONS

Kukshya et al., Design of a System Solution for Relative Positioning of Vehicles Using Vehicle-to-Vehicle Radio Communications During GPS Outages, Vehicular Technology Conference, 2005. VTC-2005-Fall. 2005 IEEE 62nd, 2005, pp. 1313-1317.

(Continued)

Primary Examiner — Adam Alharbi
(74) Attorney, Agent, or Firm — Rabin & Berdo, P.C.

(57) ABSTRACT

A vehicle position calibration method and apparatus thereof are disclosed. The vehicle position calibration method is applicable to a vehicle having a mobile calibration positioning device and at least a vehicle having a positioning device to be calibrated. The method starts with the mobile calibration positioning device transmitting a message of positioning precision level to the positioning device to be calibrated. Then, the positioning device to be calibrated sends a calibration request to the mobile calibration positioning device according to the message of positioning precision level; then the mobile calibration positioning device detects a relative position between the mobile calibration positioning device and the positioning device to be calibrated according to the calibration request. The mobile calibration positioning device computes and transmits a calibrated position to the positioning device to be calibrated; and the positioning device to be calibrated updates the position of the positioning device to be calibrated.

20 Claims, 11 Drawing Sheets

(51) Int. Cl.
*G01S 5/00* (2006.01)
*G01S 5/02* (2010.01)

(56) References Cited

U.S. PATENT DOCUMENTS

| | | | |
|---|---|---|---|
| 6,473,038 | B2 | 10/2002 | Patwari et al. |
| 6,477,465 | B1 | 11/2002 | McCall et al. |
| 7,570,927 | B2 | 8/2009 | Correal et al. |
| 7,840,355 | B2 | 11/2010 | Breed et al. |
| 8,520,695 | B1 * | 8/2013 | Rubin .................. G08G 9/02 370/337 |
| 2003/0209893 | A1 * | 11/2003 | Breed ................... B60J 10/00 280/735 |
| 2004/0230374 | A1 | 11/2004 | Tzamaloukas |
| 2008/0144944 | A1 * | 6/2008 | Breed ............... G06K 9/00832 382/224 |
| 2012/0271540 | A1 | 10/2012 | Miksa et al. |
| 2013/0261963 | A1 | 10/2013 | Hsieh et al. |

FOREIGN PATENT DOCUMENTS

| | | |
|---|---|---|
| JP | 2013246038 A | 12/2013 |
| TW | 201018947 A | 5/2010 |
| TW | 201116805 A | 5/2011 |
| TW | 201202732 A | 1/2012 |
| TW | 201223178 A | 6/2012 |
| TW | I374257 B | 10/2012 |

OTHER PUBLICATIONS

Williamson et al., A comparison of state space, range space, and carrier phase differential GPS/INS relative navigation, American Control Conference, 2000. Proceedings of the 2000, pp. 2932-2938.
Hohman et al., GPS roadside integrated precision positioning system, Position Location and Navigation Symposium, IEEE 2000, pp. 221-230.
Alam et al., A DSRC Doppler-Based Cooperative Positioning Enhancement for Vehicular Networks With GPS Availability, Vehicular Technology, IEEE Transactions on, 2011, pp. 4462-4470.
Drawil et al., Intervehicle-Communication-Assisted Localization, Intelligent Transportation Systems, IEEE Transactions on, 2010, pp. 678-691.
Kukshya et al., Performance Evaluation of a System for Estimating Relative Positions of Vehicles During GPS Outages, Intelligent Vehicles Symposium, 2006 IEEE, pp. 394-399.
Taiwan Patent Office, Office Action, Patent Application Serial No. TW102148222, Sep. 1, 2014, Taiwan.
Japan Patent Office, Office Action, Patent Application Serial No. JP 2014-108560, Mar. 31, 2015, Japan.
European Patent Office, Search Report with Written Opinion, Patent Application Serial No. EP14173598, Sep. 18, 2015, Europe.

* cited by examiner

VEHICLE POSITION CALIBRATION METHOD AND APPARATUS

CROSS-REFERENCE TO RELATED APPLICATION

The present application is based on, and claims priority form, Taiwan Patent Application No. 102148222, filed Dec. 25, 2013, the disclosure of which is hereby incorporated by reference herein in its entirety.

TECHNICAL FIELD

The technical field generally relates to a vehicle positioning calibration method and apparatus.

BACKGROUND

The known global positioning systems (GPS) available in the market are often lack in high precision and usually difficult to directly mark GPS position of the vehicle onto a lane-level map precisely. The GPS technologies experience higher errors in the environment where buildings or tall tree is abundant, such as in urban areas. Even with differential global positioning system (DGPS), wide area augmentation system (WAAS) differential calibration technology to overcome the atmospheric errors, the above techniques are still unable to solve non-line-of-sight (NLOS) problem and multipath errors.

The sources of GPS errors generally include geometric errors, atmospheric ionospheric error, troposphere error, multipath error, and the error of the receiver. The geometric errors, referring to possible errors when using satellite triangulation positioning generated, can be improved by techniques, such as, Positional Dilution of Precision (PDOP), or Horizontal Dilution of Precision (HDOP). The atmospheric ionospheric error and troposphere error usually cause an error in the range of about 3-5 meters, and can be reduced by differential calibration techniques supporting DGPS, WAAS. The multipath error is an error resulted by the satellite signal after multipath, such as, the building of reflection, and the error may be up to 5 meters. The multipath error can be improved through anti-multipath technology. The error of the receiver can be improved through enhanced accuracy and sensitivity of hardware of receiver antenna, clock and other hardware.

In addition, other techniques based on, such as, radar, image recognition, map data, to overcome GPS errors have been made to assist satellite positioning, including positioning supporting Road Side Unit (RSU) lane level (such as, DGPS, WAAS), inertial measurement unit (IMU), a three-dimensional (3D) map data assisted positioning, road scene image database identification positioning, and radar video-assisted positioning and other means. For example, the comparison of the roadside images against an image and map database to determine the position of the vehicle; capturing road-surface data features and the use of the image comparison against an image and map database to determine the position of the vehicle; using detector to detect road features and comparing against database to determine lateral relative position, and so on. Another example of attention in recent years is the Google automatic driverless car. However, all the aforementioned technologies are still limited to the precise positioning of the vehicle itself. Because autopilot vehicle is an upcoming trend with precision positioning as important foundation, therefore, how to achieve the same level of precision positioning for all positioning devices through wireless communication has become an important research topic in the industry.

SUMMARY

An exemplary embodiment describes a vehicle positioning calibration method, applicable to a vehicle having a mobile calibration positioning device and at least a vehicle having a positioning device to be calibrated, comprising: the mobile calibration positioning device transmitting a message of positioning precision level to the positioning device to be calibrated; the positioning device to be calibrated sending a calibration request to the mobile calibration positioning device according to the message of positioning precision level; the mobile calibration positioning device detecting a relative position between the mobile calibration positioning device and the positioning device to be calibrated according to the calibration request; the mobile calibration positioning device computing and transmitting a calibrated position to the positioning device to be calibrated; and the positioning device to be calibrated updating the position of the positioning device to be calibrated according to the calibrated position.

Another embodiment describes a vehicle positioning calibration method, applicable to a vehicle having a mobile calibration positioning device and at least a vehicle having a positioning device to be calibrated, comprising: the mobile calibration positioning device transmitting a message of positioning precision level and a position of the mobile calibration positioning device to the positioning device to be calibrated; the positioning device to be calibrated detecting a relative position between the mobile calibration positioning device and the positioning device to be calibrated, and computing a calibrated position of the positioning device to be calibrated according to the message of positioning precision level; and the positioning device to be calibrated updating the position of the positioning device to be calibrated according to the calibrated position.

Another exemplary embodiment describes a vehicle positioning calibration method, applicable to a first vehicle having a first positioning device to be calibrated, comprising: the first vehicle passing a calibration point having a lane-level calibration positioning capability and being calibrated; the first vehicle detecting a relative position between the first vehicle and a second vehicle having a second positioning device to be calibrated, and the first vehicle computing a calibrated position of the second vehicle to be calibrated by adding the position of the first vehicle and the relative position; and the first vehicle transmitting the calibrated position of the second vehicle having the second positioning device to be calibrated through a wireless means to the second vehicle having the second positioning device to be calibrated and the second vehicle having the second positioning device to be calibrated updating the position of the second vehicle according to the calibrated position.

Another exemplary embodiment describes a vehicle positioning calibration method, applicable to a vehicle having a mobile calibration positioning device, comprising: the mobile calibration positioning device transmitting a message of positioning precision level to at least a positioning device to be calibrated; the mobile calibration positioning device receiving a calibration request transmitted by the at least a positioning device; and the mobile calibration positioning device detecting a relative position between the mobile calibration positioning device and the at least a positioning device to be calibrated according to the calibration request;

and the mobile calibration positioning device computing and transmitting a calibrated position to the at least a positioning device to be calibrated.

Another exemplary embodiment describes vehicle position calibration apparatus, applicable to a vehicle, comprising: a calibration positioning module, for determining a position of the vehicle position calibration apparatus; a communication module; and a detection module, for detecting a relative position of at least a positioning device to be calibrated; the vehicle position calibration apparatus executing: transmitting a message of positioning precision level to the at least a positioning device to be calibrated; receiving a calibration request transmitted by the at least a positioning device to be calibrated; and detecting a relative position between the calibration positioning device and the at least a positioning device to be calibrated according to the calibration request; and computing and transmitting a calibrated position to the at least a positioning device to be calibrated.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
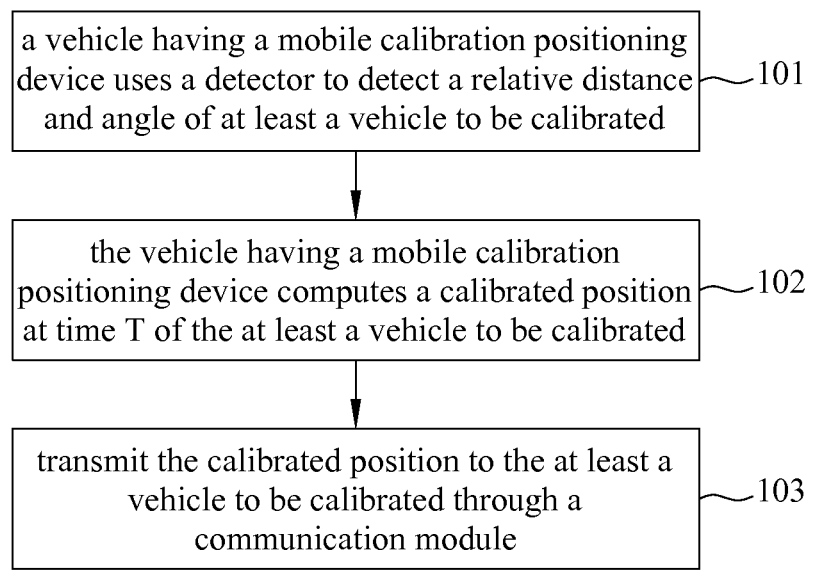
FIG. 1 shows a flowchart of vehicle positioning calibration method in accordance with an exemplary embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 shows a flowchart of vehicle positioning calibration method in accordance with an exemplary embodiment. As shown in FIG. 1, step 101 is for a vehicle having a mobile calibration positioning device to use a detector to detect a relative distance and angle of at least a vehicle to be calibrated; step 102 is for the vehicle having a mobile calibration positioning device to compute a calibrated position at time T of the at least a vehicle to be calibrated, which equals to the absolute position of the vehicle having the mobile calibration positioning device plus the relative distance and angle; and step 103 is to transmit the calibrated position to the at least a vehicle to be calibrated through a communication module, wherein each of the at least a vehicle to be calibrated is disposed with a positioning device to be calibrated, and the positioning precision level of the mobile calibration positioning device is higher than the positioning precision level of the positioning device to be calibrated. When the positioning precision level of the mobile calibration positioning device is lane-level or has an error range of centimeters, the positioning precision level of the positioning device to be calibrated is also lane-level or has an error range of centimeters after calibration, and the calibrated positioning device can further be used to calibrate the positioning of other vehicles.

Furthermore, the above positioning precision level can be devised to achieve an optimized level through techniques to reduce errors on the positioning device caused by the aforementioned geometric errors, atmospheric ionospheric error, troposphere error, multipath error, and the error of the receiver. By changing the weights for the utilized techniques, the optimized positioning accuracy can be achieved.

For example, assume that the error caused by atmospheric ionospheric reflection is 4 meters, the error caused by troposphere reflections is 0.7 meters, the error caused by receiver noise is 0.5 meters, the error caused by multipath is 1.4 meters, and the error caused by Dilution of Precision (DOP) is at least 1-6 meters. A total maximum error can reach 0.7+0.5+1.4+6=12.6 meters. When the techniques utilized by positioning device to improve the estimation are depicted as A, B, C, D, E . . . and so on, the precision level PL of the positioning device can be calculated by the following formula:

$$PL = A \times a\% + B \times b\% + C \times c\% + D \times d\% + E \times e\%$$

Wherein, a, b, c, d, e are the weights of the technologies A, B, C, D, E, respectively. For example, technologies A, B are DGPS, WAAS to overcome the atmospheric error, technology C may be, such as, high sensitivity GPS antenna technology to improve the geometric error, technology D can utilize the satellite selection technique of the GPS multi-satellite system to improve multipath errors, and technology E can be, such as, radar, video, 3D map data and other auxiliary positioning technologies to improve positioning precision. In the foregoing example, the weights a, b, c, d are respectively calculated as: a=(0.5)/12.6=3.97, b=(4+0.7)/12.6=37.3, c=6/12.6=47.6, d=1.4/12.6=11.11.

It should be noted that when a technology of higher accuracy is utilized, the weight of the technology can be increased. For example, if the technology E uses RSU-assisted positioning mode, the weight e may be set to 80. Furthermore, in some specific cases, such as, in high-rise urban environment, the error caused by multi-path effect will be greater. Hence, in the environment, the weight of corresponding technologies to improve the error can also be increased.

The following uses various application embodiments to illustrate the vehicle position calibration method shown in FIG. 1 applied to various scenarios.

Figure 2:
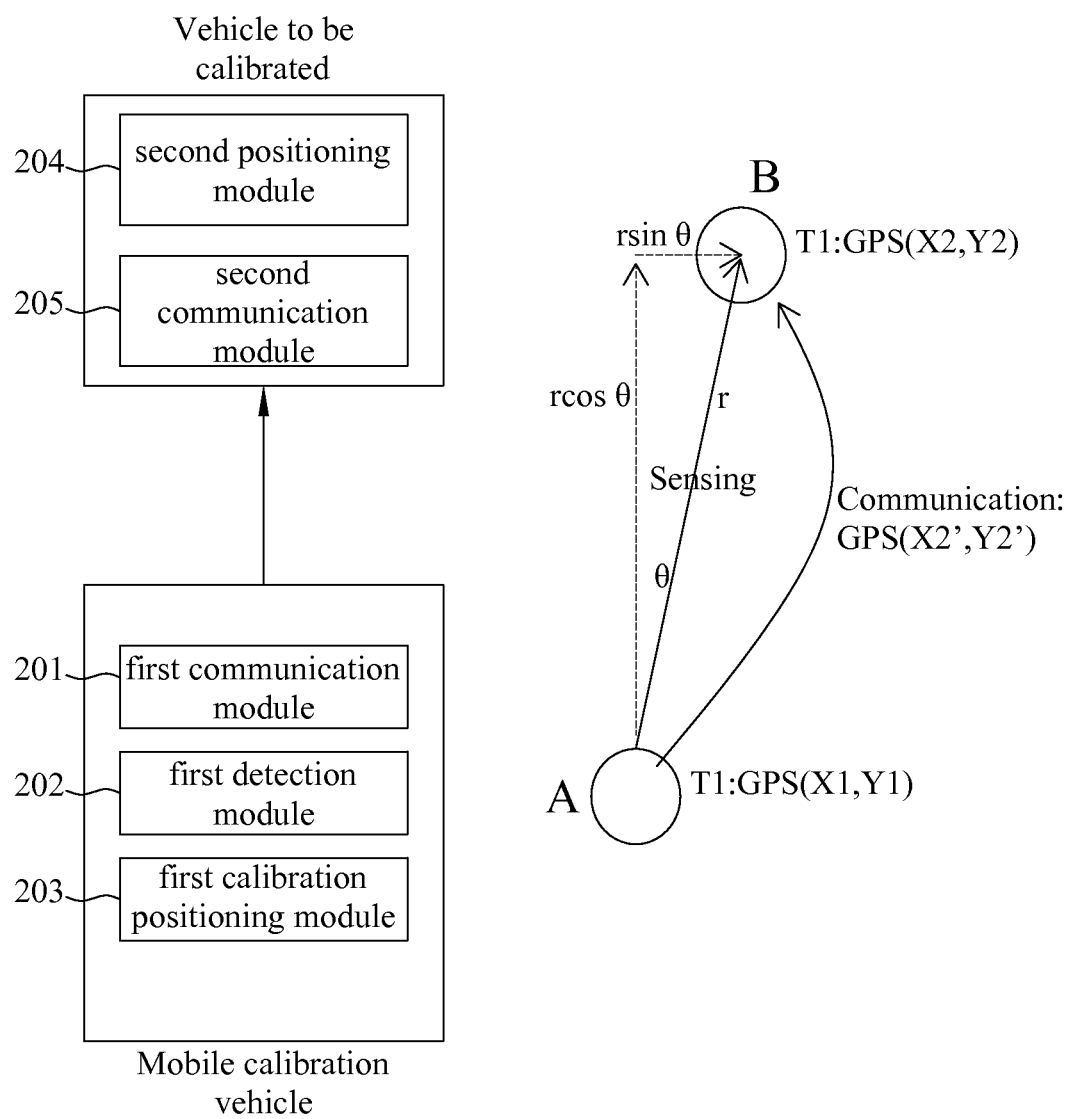
FIG. 2 shows a schematic view of an embodiment of vehicle positioning calibration method in accordance with an exemplary embodiment.

FIG. 2 shows a schematic view of an embodiment of vehicle positioning calibration method in accordance with an exemplary embodiment, wherein T1 indicates a first time, GPS (X1, Y1) indicates a GPS longitude and latitude of a vehicle A at the first time T1, GPS (X2, Y2) indicates a GPS longitude and latitude of a vehicle B at the first time T1, and GPS (X2', Y2') indicates a GPS longitude and latitude of a vehicle B at the first time T1 as computed by the vehicle A. As shown in FIG. 2, the scenario is a first vehicle calibrates a second vehicle to be calibrated, wherein the first vehicle transmits a message describing the positioning precision level of a mobile calibration positioning device disposed at the first vehicle to the second vehicle to be calibrated, and the second vehicle to be calibrated sends a calibration request to the first vehicle. In FIG. 2, the first vehicle disposed with a mobile calibration positioning device is vehicle A and the second vehicle to be calibrated is vehicle B. The mobile calibration positioning device disposed on the vehicle A includes: a first communication module 201, for communicating with other vehicles to be calibrated and receiving GPS position information through a wireless means, wherein the wireless means may be, such as, wireless access in the vehicular environment/dedicated short-range communications (WAVE/DSRC), Wi-Fi, third-generation partnership project (3GPP) 3G/4G/5G/xG wireless communication, Bluetooth, radio frequency identification (RFID), optical communication; a first detection module 202, for measuring a relative position between the first vehicle (A) and the second vehicle (B), embodied by detection technology able to detect relative distance and position of objects, such as radar, infrared, ultrasonic, image identification; and a first calibration positioning module 203, for computing a GPS position of the first vehicle, and computing GPS positions of the second vehicle (B) according to the first communication module 201 and the first detection module 202. On the other hand, the positioning device to be calibrated disposed on the second vehicle (B) includes: a second positioning module 204, for computing a GPS position of the second vehicle; and a second communication module 205, for communicating with the first vehicle with a mobile calibration positioning device and receiving GPS position information through a wireless means, wherein the positioning precision level of the first calibration positioning module 203 disposed on the first vehicle (A) is higher than the positioning precision level of the second positioning module 204 disposed on the second vehicle (B), in other words, more precise in positioning.

Wherein, when the second vehicle to be calibrated receives the message including the positioning precision level transmitted by the first vehicle, the second vehicle to be calibrated determines whether to send a calibration request according to the positioning precision level of the positioning device disposed on the second vehicle.

Figure 3:
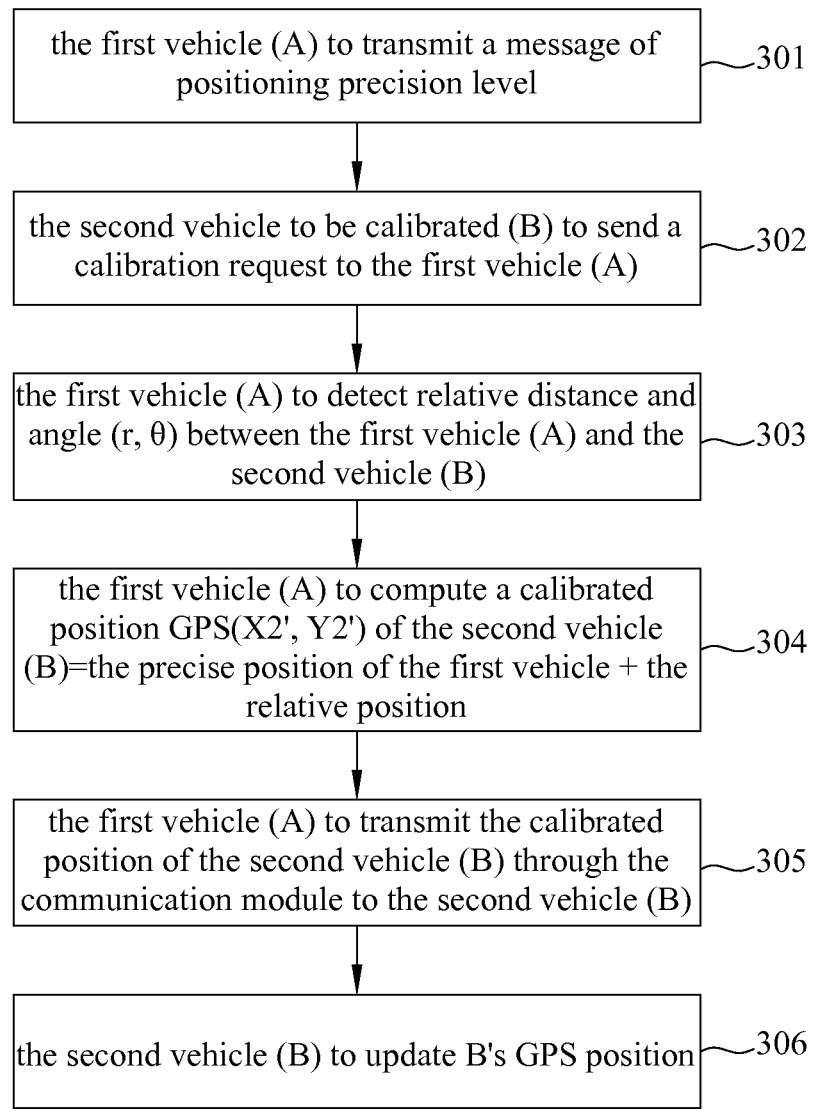
FIG. 3 shows an execution flowchart of the embodiment of vehicle positioning calibration method of FIG. 2 in accordance with an exemplary embodiment.

FIG. 3 shows an execution flowchart of the embodiment of vehicle positioning calibration method of FIG. 2 in accordance with an exemplary embodiment. As shown in FIG. 3, step 301 is for the first vehicle (A) to transmit a message of positioning precision level; step 302 is for the second vehicle to be calibrated (B) to send a calibration request to the first vehicle (A) according to the message of positioning precision level; step 303 is, according to the calibration request, for the first vehicle (A) to use a detection module, such as, radar, infrared, ultrasonic, image identification, and so on detection technology able to detect relative distance and position of objects for measuring a relative position between the first vehicle (A) and the second vehicle (B), such as, relative distance and angle (r, θ); step 304 is for the first vehicle (A) to compute a calibrated position GPS(X2', Y2') of the second vehicle (B) according to the calibration request. that is, the precise position of the first vehicle+the relative position; step 305 is for the first vehicle (A) to transmit the calibrated position of the second vehicle (B) through the communication module to the second vehicle (B); and step 306 is for the second vehicle (B) to update the GPS position as GPS(X2', Y2'). In other words, GPS(X2', Y2')=GPS(X1+r·sin θ, Y1+r·cos θ), wherein GPS(X1, Y1), GPS(X2, Y2), GPS(X2', Y2'), r and θ are as described earlier.

Figure 4:
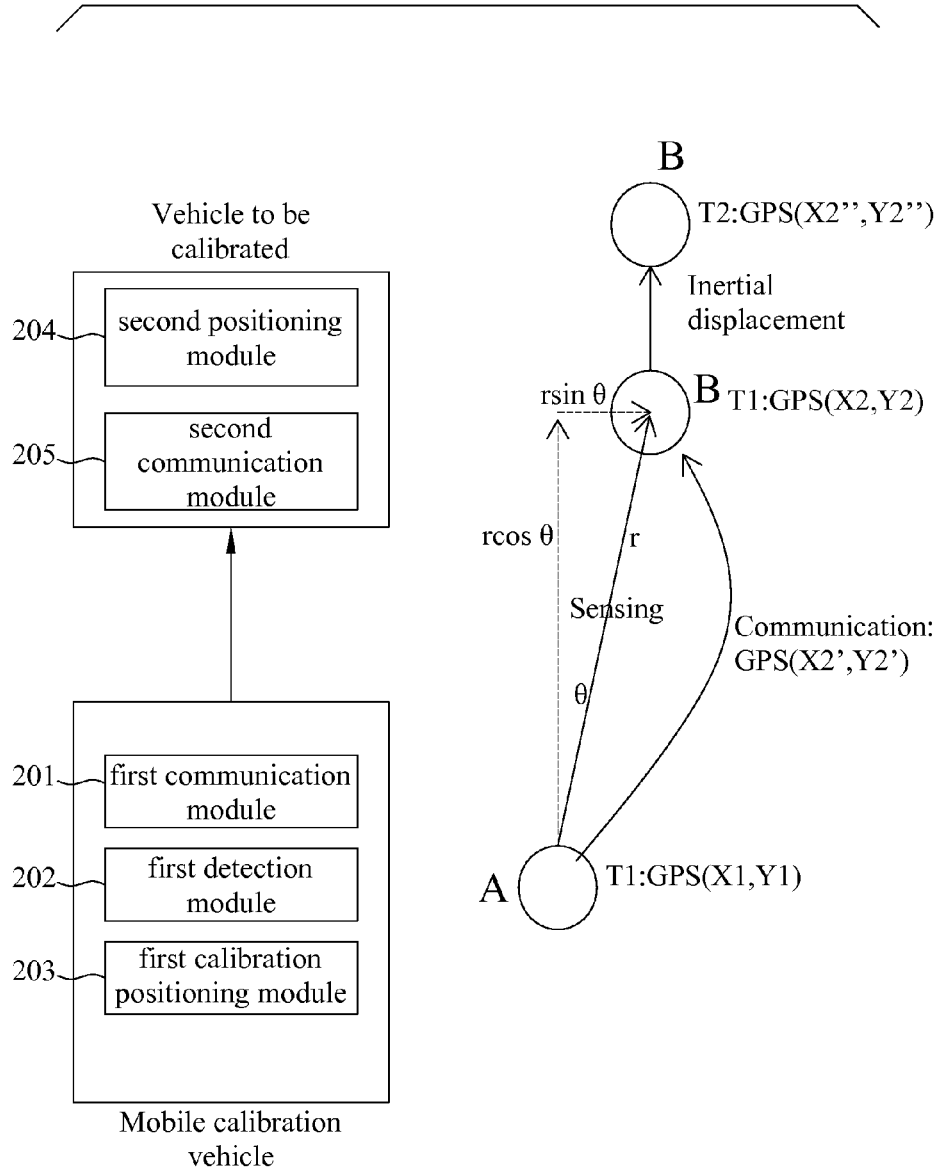
FIG. 4 shows a schematic view of another embodiment of vehicle positioning calibration method in accordance with an exemplary embodiment.

FIG. 4 shows a schematic view of another embodiment of vehicle positioning calibration method in accordance with an exemplary embodiment. The present embodiment is similar to the previous embodiment, and the main difference is in that a displacement, such as, an inertial displacement, is considered during the time to transmit and process signals. Therefore, the second vehicle (B) also adds the displacement of the second vehicle (B) in the duration of signal transmission and processing when updating the calibrated position.

Figure 5:
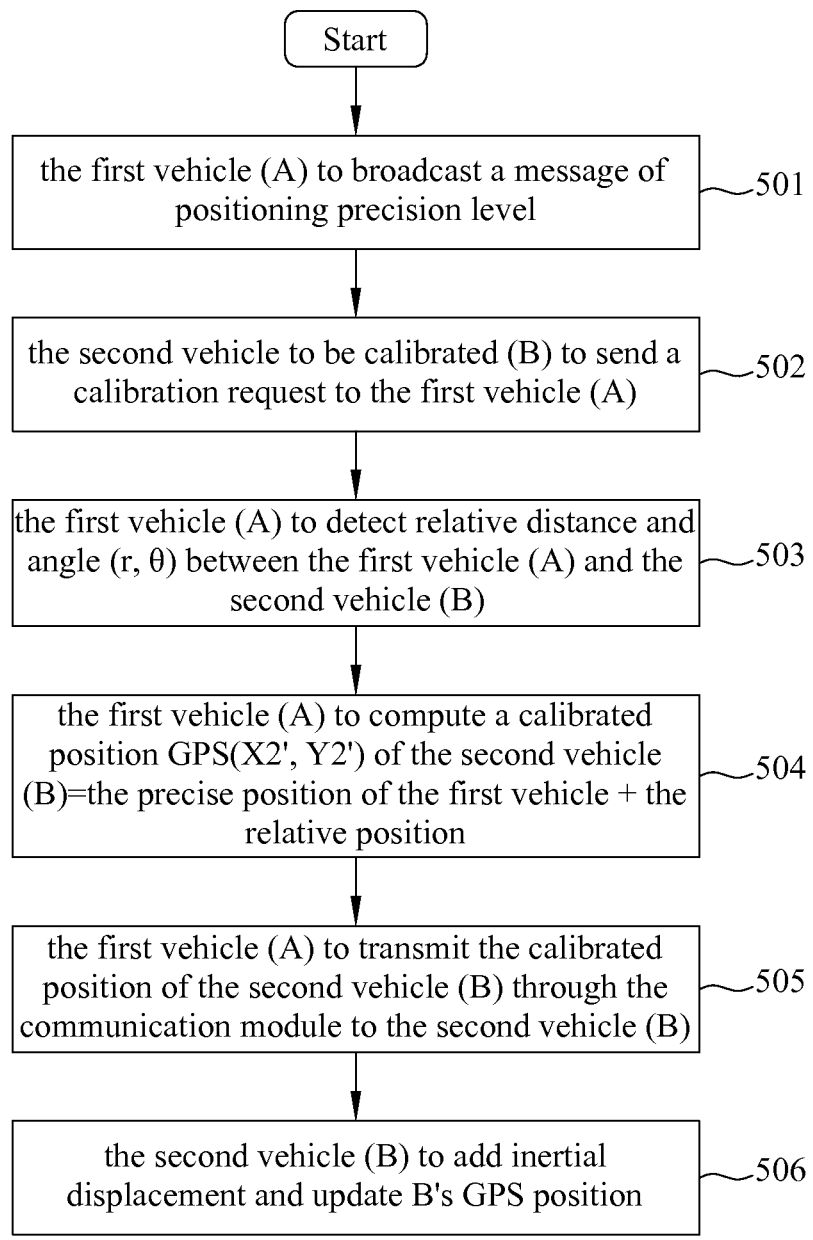
FIG. 5 shows an execution flowchart of the embodiment of vehicle positioning calibration method of FIG. 4 in accordance with an exemplary embodiment.

FIG. 5 shows an execution flowchart of the embodiment of vehicle positioning calibration method of FIG. 4 in accordance with an exemplary embodiment. As shown in FIG. 5, step 501 is for the first vehicle (A) to broadcast a message of positioning precision level; step 502 is for the second vehicle to be calibrated (B) to send a calibration request to the first vehicle (A) according to the message of positioning precision level; step 503 is, according to the calibration request, for the first vehicle (A) to detect relative position between the first vehicle (A) and the second vehicle (B), such as, relative distance and angle (r, θ); step 504 is for the first vehicle (A) to compute a calibrated position GPS(X2', Y2') of the second vehicle (B). that is, the precise position of the first vehicle+the relative position according to the calibration request; step 505 is for the first vehicle (A) to transmit the calibrated position of the second vehicle (B) through the communication module to the second vehicle (B); and step 506 is for the second vehicle (B) to update the GPS position as GPS(X2", Y2"), wherein GPS(X2", Y2")=GPS(X2', Y2')+the displacement of the second vehicle (B) during calibration.

Figure 6:
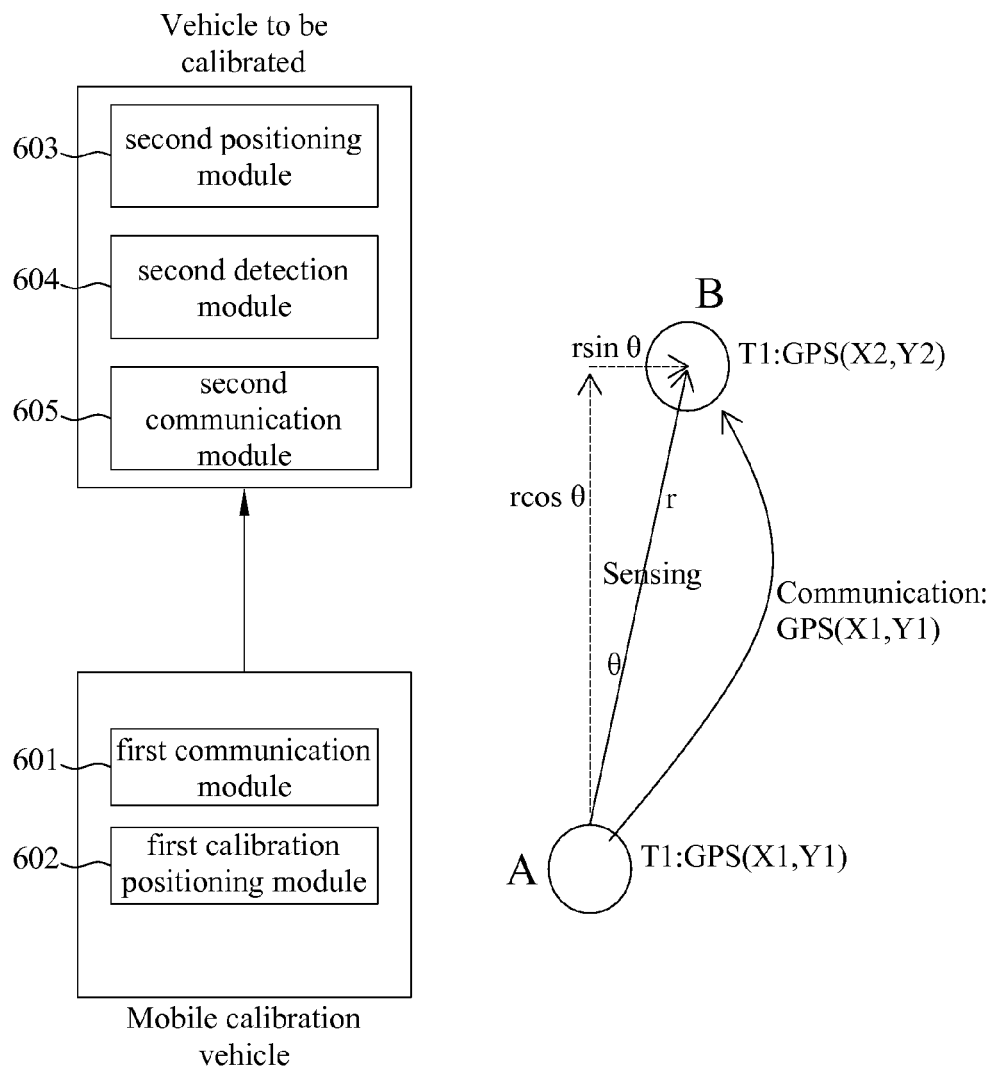
FIG. 6 shows a schematic view of another embodiment of vehicle positioning calibration method in accordance with an exemplary embodiment.

FIG. 6 shows a schematic view of another embodiment of vehicle positioning calibration method in accordance with an exemplary embodiment. The present embodiment is similar to the previous embodiment, except that the vehicle to be calibrated will perform the calibration after receiving message of positioning precision level from the first vehicle. It should be noted that in this embodiment, the first vehicle (A) is disposed with a first communication module 601, and a first calibration positioning module 602; the second vehicle (B) to be calibrated is disposed with a second positioning module 603, a second detection module 604 and a second communication module 605, wherein the positioning precision level of the first calibration positioning module 602 disposed on the first vehicle (A) is higher than the positioning precision level of the second positioning module 603 disposed on the second vehicle (B), in other words, more precise in positioning.

Figure 7:
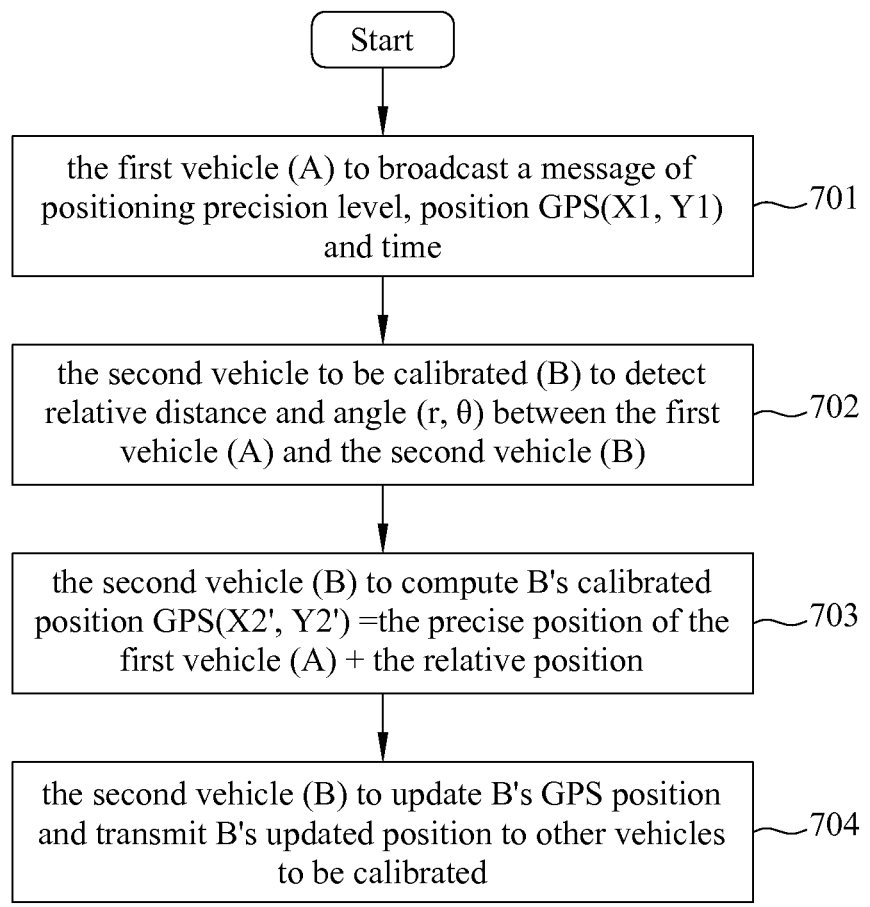
FIG. 7 shows an execution flowchart of the embodiment of vehicle positioning calibration method of FIG. 6 in accordance with an exemplary embodiment.

FIG. 7 shows an execution flowchart of the embodiment of vehicle positioning calibration method of FIG. 6 in accordance with an exemplary embodiment. As shown in FIG. 7, step 701 is for the first vehicle (A) to broadcast a message of positioning precision level, position GPS(X1, Y1) and time; step 702 is for the second vehicle to be calibrated (B) to detect relative position between the first vehicle (A) and the second vehicle (B), such as, relative distance and angle (r, θ); step 703 is for the second vehicle (B) to compute a calibrated position GPS(X2', Y2'), that is, the precise position of the first vehicle (A)+the relative position; step 704 is for the second vehicle (B) to update the GPS position as GPS(X2', Y2'). In other words, GPS(X2',Y2')=GPS(X1+r·sin θ,Y1+r·cos θ), wherein GPS(X1, Y1), GPS(X2, Y2), GPS(X2', Y2'), r and θ are as described earlier. After updating the position, the second vehicle to be calibrated (B) can transmit the updated position to other vehicles to be calibrated disposed with positioning devices to be calibrated.

Figure 8:
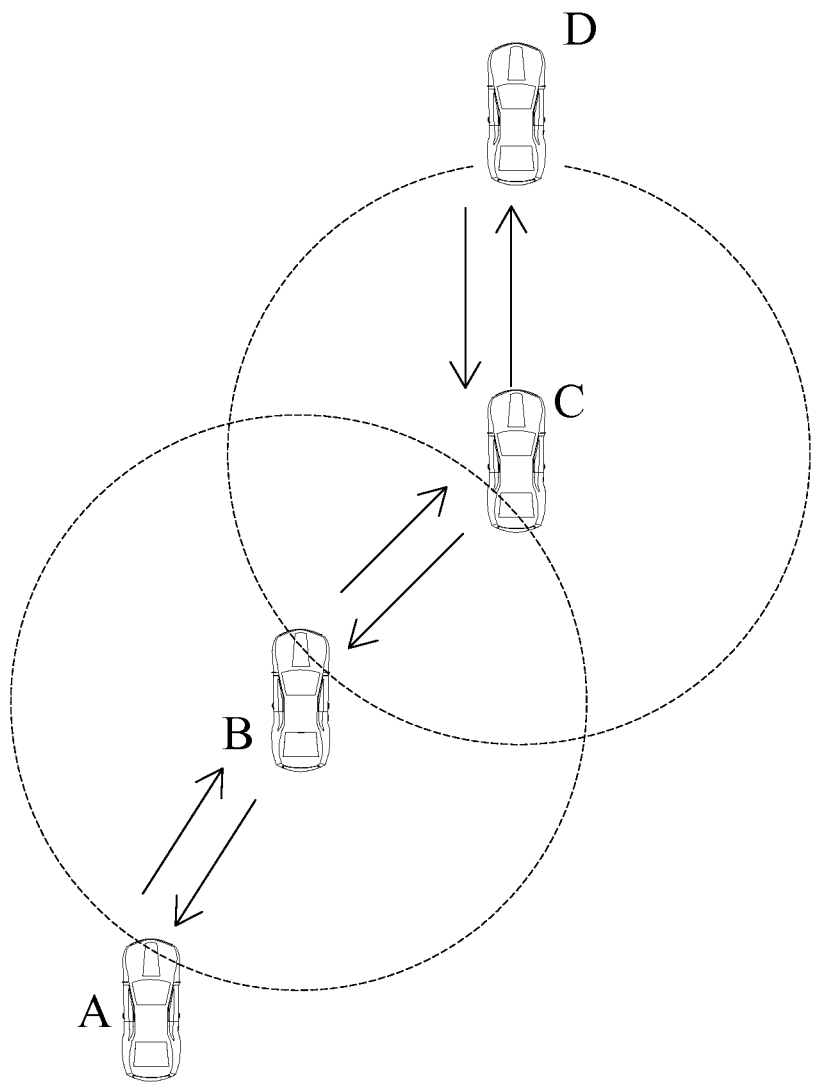
FIG. 8 shows a schematic view of another embodiment of vehicle positioning calibration method in accordance with an exemplary embodiment.

FIG. 8 shows a schematic view of another embodiment of vehicle positioning calibration method in accordance with an exemplary embodiment. The embodiment shows how the first vehicle is used to calibrate a plurality of second vehicles to be calibrated and draw dynamic driving maps wherein the vehicles can be dynamically drawn on a lane-level map information system. In the present embodiment, the vehicle B is the vehicle to perform mobile calibration, while the vehicles A, C D are the vehicles to be calibrated.

Figure 9:
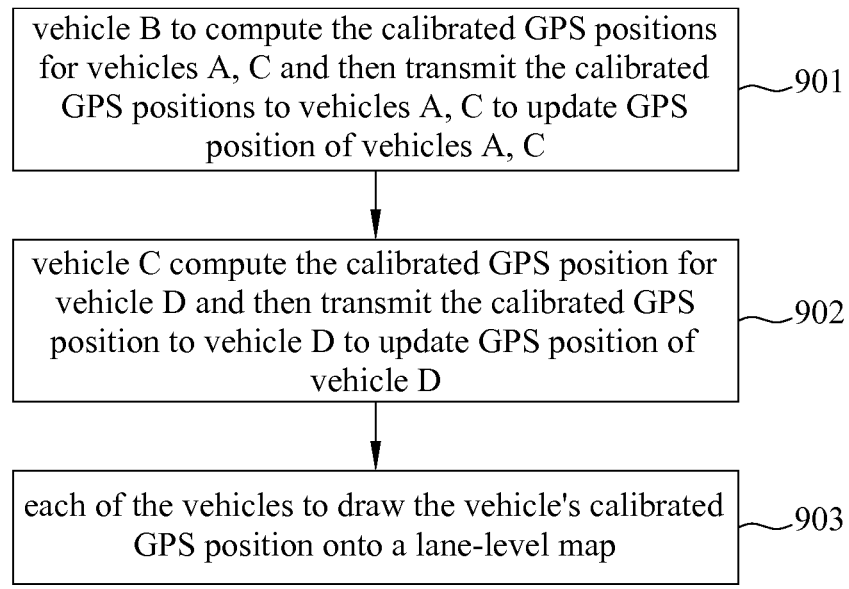
FIG. 9 shows an execution flowchart of the embodiment of vehicle positioning calibration method of FIG. 8 in accordance with an exemplary embodiment.

FIG. 9 shows an execution flowchart of the embodiment of vehicle positioning calibration method of FIG. 8 in accordance with an exemplary embodiment. As shown in FIG. 9, step 901 is for the vehicle B to compute the calibrated GPS positions for the vehicles A, C and then transmit the calibrated GPS positions to the vehicles A, C to update GPS position of vehicles A, C; step 902 is for the vehicle C compute the calibrated GPS position for the vehicle D and then transmit the calibrated GPS position to the vehicle D to update GPS position of vehicle D; and step 903 is for each of the vehicles to draw the calibrated GPS positions of the vehicles onto a lane-level map through a dynamic neighbor vehicle module.

Figure 10:
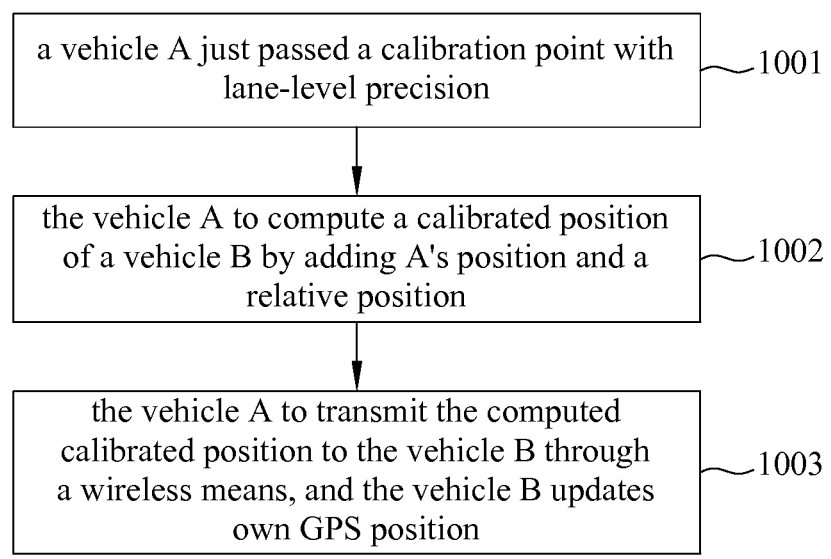
FIG. 10 shows a schematic view of another embodiment of vehicle positioning calibration method in accordance with an exemplary embodiment.

FIG. 10 shows a schematic view of another embodiment of vehicle positioning calibration method in accordance with an exemplary embodiment. The present embodiment describes how to use a vehicle just passed a calibration point as a mobile calibration vehicle to calibrate other vehicles to be calibrated. When a vehicle just passed a lane-level calibration point, such as, an RSU-assisted lane, the positioning of the vehicle is precise. At this point, the vehicle can be used to calibrate other vehicles to be calibrated. As shown in FIG. 10, step 1001 a vehicle A just passed a calibration point with lane-level precision; step 1002 is for the vehicle A to compute a calibrated position of a vehicle B by adding the position of the first vehicle A and a relative position; and step 1003 is for the vehicle A to transmit the computed calibrated position to the vehicle B through a wireless means, and the vehicle B updates the GPS position of vehicle B according to the calibrated position.

Figure 11:
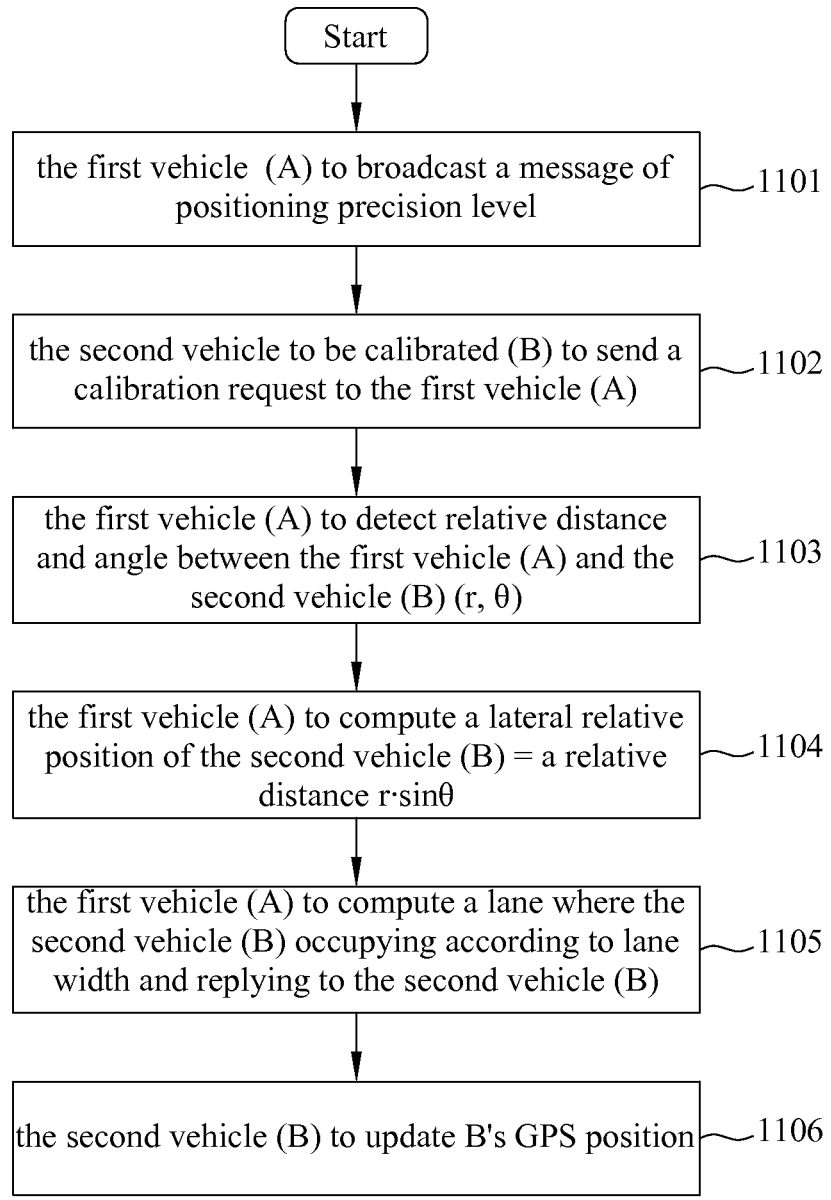
FIG. 11 shows an execution flowchart of the embodiment of vehicle positioning calibration method in accordance with an exemplary embodiment.

FIG. 11 shows an execution flowchart of the embodiment of vehicle positioning calibration method in accordance with an exemplary embodiment. The main difference between the present embodiment and the previous embodiments is that the vehicle A in the present embodiment can further compute the lane where the vehicle B occupies based on the lane width. As shown in FIG. 11, step 1101 is for the first vehicle (A) to broadcast a message of positioning precision level; step 1102 is, according to the calibration request, for the second vehicle to be calibrated (B) to send a calibration request to the first vehicle (A) according to the message of positioning precision level; step 1103 is for the first vehicle (A) to detect a relative position between the first vehicle (A) and the second vehicle (B), such as, relative distance and angle (r, θ); step 1104 is for the first vehicle (A) to compute a lateral relative position of the second vehicle (B), i.e., a relative distance r·sin θ according to the calibration request; step 1105 is for the first vehicle (A) to compute a lane where the second vehicle (B) occupying according to lane width and replying to the second vehicle (B); and step 1106 is for the second vehicle (B) to update the GPS position of second vehicle (B) according to the lane computed by the first vehicle (A).

The vehicle positioning calibration method in the present disclosure is based on the concept of a mobile calibration station, wherein a vehicle disposed with a positioning device of higher precision level can calibrate the positions of other vehicles or positioning devices to be calibrated through a wireless means and transmit the calibration results to the other vehicles or position devices to be calibrated for update. When the mobile calibration station has a positioning device with a lane-level precision level or with error in range of centimeters, the calibrated other vehicles will also reach a positioning device with a lane-level precision level or with error in range of centimeters and can then be to calibrate further vehicles. In addition, the present disclosure can further be applied to other applications, such as, mapping vehicle positions to lane-level map information or even 3D map information to display realistic vehicles, lanes and street views for future navigation applications.

An embodiment of the present disclosure provides a vehicle positioning calibration method, including: a vehicle having a mobile calibration positioning device to use a detector to detect a relative distance and angle of at least a vehicle to be calibrated; the vehicle having a mobile calibration positioning device to compute a calibrated position at time T of the at least a vehicle to be calibrated; and transmitting the calibrated position to the at least a vehicle to be calibrated through a communication module, wherein each of the at least a vehicle to be calibrated is disposed with a positioning device to be calibrated, and the positioning precision level of the mobile calibration positioning device is higher than the positioning precision level of the positioning device to be calibrated. When the positioning precision level of the mobile calibration positioning device is lane-level or has an error range of centimeters, the positioning precision level of the positioning device to be calibrated is also lane-level or has an error range of centimeters after calibration.

Similarly, when the vehicle having a mobile calibration position device provides height and other information, three-dimensional (3D) or other dimensional calibration can also be performed.

In summary, the present disclosure utilizes the inter-vehicle communication for collaborative positioning and the concept of mobile calibration station to calibrate GPS positions of other vehicles. The vehicle position calibration method in the present disclosure can use a vehicle with a positioning device of a higher precision level to collaboratively calibrate the positions of other vehicles through wireless communication. In other words, by using a vehicle disposed with a positioning device of a higher precision level and a detection module to detect relative positions of surrounding vehicles as a mobile calibration vehicle, the mobile calibration vehicle can transmit a calibrated position to at least one of the surrounding vehicles through communication device to achieve positioning other vehicles more precisely.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A vehicle positioning calibration method, applicable to a vehicle, having a mobile calibration positioning device, and at least another vehicle having a positioning device to be calibrated, the method comprising:

the mobile calibration positioning device transmitting a message of positioning precision level to the positioning device to be calibrated, the message of positioning precision level includes a positioning precision level of the mobile calibration positioning device;

the positioning device to be calibrated sending a calibration request to the mobile calibration positioning device according to the message of positioning precision level;

the mobile calibration positioning device detecting a relative position between the mobile calibration positioning device and the positioning device to be calibrated according to the calibration request;

the mobile calibration positioning device computing and transmitting a calibrated position to the positioning device to be calibrated; and the positioning device to be calibrated updating the position of the positioning device to be calibrated according to the calibrated position.

2. The vehicle positioning calibration method as claimed in claim 1, wherein the positioning device to be calibrated determines whether to send the calibration request to the mobile calibration positioning device based on a positioning precision level of the positioning device to be calibrated after receiving the message of positioning precision level from the mobile calibration positioning device.

3. The vehicle positioning calibration method as claimed in claim 1, wherein the calibrated position of the positioning device to be calibrated is a position of the mobile calibration positioning device plus an amount corresponding to the relative position.

4. The vehicle positioning calibration method as claimed in claim 1, wherein the positioning device to be calibrated computes an inertial displacement of the at least another vehicle having the positioning device to be calibrated within a calibration duration and adds an amount, corresponding to the inertial displacement, to the calibrated position and updates the position of the positioning device to be calibrated according to the amount added with the calibrated position.

5. The vehicle positioning calibration method as claimed in claim 1, wherein the mobile calibration positioning device transmits the message of positioning precision level to the positioning device to be calibrated through a wireless communication and transmits the calibrated position to the positioning device to be calibrated through the wireless communication.

6. The vehicle positioning calibration method as claimed in claim 1, wherein after the position of the positioning device to be calibrated has been updated to an updated calibrated position by being calibrated according to the calibrated position transmitted by the mobile calibration positioning device, the positioning device to be calibrated transmits the updated calibrated position to another vehicle having another positioning device to be calibrated.

7. A vehicle positioning calibration method, applicable to a vehicle having a mobile calibration positioning device, and at least another vehicle having a positioning device to be calibrated, the method comprising:

the mobile calibration positioning device transmitting a message of positioning precision level and a position of the mobile calibration positioning device to the positioning device to be calibrated, the message of positioning precision level includes a positioning precision level of the mobile calibration positioning device;

the positioning device to be calibrated detecting a relative position between the mobile calibration positioning device and the positioning device to be calibrated, and computing a calibrated position of the positioning device to be calibrated according to the message of positioning precision level; and the positioning device to be calibrated updating the position of the positioning device to be calibrated according to the calibrated position.

8. The vehicle positioning calibration method as claimed in claim 7, wherein the calibrated position of the positioning device to be calibrated is the position of the mobile calibration positioning device plus an amount corresponding to the relative position.

9. The vehicle positioning calibration method as claimed in claim 7, wherein the positioning device to be calibrated computes an inertial displacement of the at least another vehicle having the positioning device to be calibrated within a calibration duration, adds an amount, corresponding the inertial displacement, to the calibrated position and updates the position of the positioning device to be calibrated according to the amount added with the calibrated position.

10. The vehicle positioning calibration method as claimed in claim 7, wherein the mobile calibration positioning device transmits the message of positioning precision level to the positioning device to be calibrated through a wireless communication.

11. The vehicle positioning calibration method as claimed in claim 7, wherein after the position of the positioning device to be calibrated has been updated to an updated calibrated position by being calibrated according to the calibrated position, the positioning device to be calibrated transmits the updated calibrated position to other vehicles having a positioning device to be calibrated.

12. A vehicle positioning calibration method, applicable to a first vehicle having a first positioning device to be calibrated, comprising:

the first vehicle passing a calibration point having a lane-level calibration positioning capability and being calibrated;

the first vehicle transmitting a message of positioning precision level to a second vehicle having a second positioning device to be calibrated, the message of positioning precision level includes a positioning precision level of the first positioning device;

the second positioning device sending a calibration request to the first positioning device according to the message of positioning precision level;

the first vehicle detecting a relative position between the first vehicle and the second vehicle having the second positioning device to be calibrated, and the first vehicle computing a calibrated position of the second vehicle to be calibrated by adding the position of the first vehicle and an amount corresponding to the relative position; and the first vehicle transmitting the calibrated position of the second vehicle having the second positioning device to be calibrated through a wireless communication to the second vehicle having the second positioning device to be calibrated and the second vehicle having the second positioning device to be calibrated updating the position of the second vehicle according to the calibrated position.

13. The vehicle positioning calibration method as claimed in claim 12, wherein the calibration point having the lane-level calibration positioning capability is a road side unit (RSU)-assisted road positioning point.

14. The vehicle positioning calibration method as claimed in claim 12, wherein the second vehicle having the second positioning device to be calibrated computes an inertial displacement of the second vehicle within a calibration duration and adds an amount, corresponding to the inertial displacement, to the calibrated position and updates the position of the second vehicle according to the amount added with the calibrated position.

15. The vehicle positioning calibration method as claimed in claim 12, wherein the first vehicle computes a lane which the second vehicle occupies according to a lane width.

16. A vehicle positioning calibration method, applicable to a vehicle having a mobile calibration positioning device, comprising:
- the mobile calibration positioning device transmitting a message of positioning precision level to at least a positioning device to be calibrated, the message of positioning precision level includes a positioning precision level of the mobile calibration positioning device;
- the mobile calibration positioning device receiving a calibration request transmitted by the at least a positioning device;
- the mobile calibration positioning device detecting a relative position between the mobile calibration positioning device and the at least a positioning device to be calibrated according to the calibration request; and
- the mobile calibration positioning device computing and transmitting a calibrated position to the at least a positioning device to be calibrated.

17. The vehicle positioning calibration method as claimed in claim 16, wherein the calibrated position of the at least a positioning device to be calibrated is a position of the vehicle having the mobile calibration positioning device plus an amount corresponding to the relative position.

18. The vehicle positioning calibration method as claimed in claim 16, wherein the calibrated position of the at least a positioning device to be calibrated is a lane where the at least a positioning device to be calibrated occupies.

19. The vehicle positioning calibration method as claimed in claim 16, wherein the vehicle having the mobile calibration positioning device transmits the message of positioning precision level to the at least a positioning device to be calibrated through a wireless communication and transmits the calibrated position to the at least a positioning device to be calibrated through the wireless communication.

20. A positioning calibration apparatus, applicable to a vehicle, comprising:
- a calibration positioning module, for determining a position of the positioning calibration apparatus;
- a communication module; and
- a detection module, for detecting a relative position of at least a positioning device to be calibrated;

the positioning calibration apparatus executing:
- transmitting a message of positioning precision level to the at least a positioning device to be calibrated, the message of positioning precision level includes a positioning precision level of the positioning calibration apparatus;
- receiving a calibration request transmitted by the at least a positioning device to be calibrated;
- detecting a relative position between the positioning calibration apparatus and the at least a positioning device to be calibrated according to the calibration request; and
- computing and transmitting a calibrated position to the at least a positioning device to be calibrated.

* * * * *